United States Patent [19]

Wiley et al.

[11] Patent Number: 5,687,320

[45] Date of Patent: Nov. 11, 1997

[54] INDIRECT METHOD FOR NETWORK PERIPHERAL AUTOMATED DETECTION

[75] Inventors: Steve R. Wiley, Boise; Matthew J. Motes, Meridian, both of Id.

[73] Assignee: Hewlett-Packard Company, Palo Alto, Calif.

[21] Appl. No.: 431,328

[22] Filed: Apr. 27, 1995

[51] Int. Cl.$^6$ .................................................. G06F 13/00
[52] U.S. Cl. ........................... 395/200.16; 395/200.11; 395/200.12; 395/610
[58] Field of Search .................... 395/868, 200.16, 395/610, 200.11, 200.12; 380/25

[56] References Cited

U.S. PATENT DOCUMENTS

| | | | |
|---|---|---|---|
| 4,875,158 | 10/1989 | Ashkin et al. | 395/868 |
| 4,914,571 | 4/1990 | Baratz et al. | 395/600 |
| 5,185,860 | 2/1993 | Wu | 395/200 |
| 5,511,122 | 4/1996 | Atkinson | 380/25 |

*Primary Examiner*—Thomas C. Lee
*Assistant Examiner*—Forood Boortalary

[57] ABSTRACT

This invention allows a selected type of network device or resource (e.g. printers) to be discovered on a subnetwork and on remote subnetworks on a network. A broadcast message is sent requesting a response from each host on the subnetwork with a file having a listing of the device. Upon receipt of responses, a STIFLE message is transmitted to the host, thereby allowing subsequent broadcast messages to generate responses from remaining hosts. The responding hosts are then queried in order to obtain address information of potential devices on the subnetwork. A corresponding procedure obtains addresses of agents on remote subnetworks. The agents are then queried in order to obtain addresses of servers containing lists of potential devices on the remote subnetworks.

11 Claims, 3 Drawing Sheets

INDIRECT METHOD FOR NETWORK PERIPHERAL AUTOMATED DETECTION

FIELD OF THE INVENTION

This invention relates to computer network communications. More specifically, the invention is directed to allowing a network resource to be discovered on a network, such as a TCP/IP network.

BACKGROUND OF THE INVENTION

In computer networks, multiple computer devices are interconnected in order to provide common access to data, computing functions and peripheral devices. It is desirable in networks to reduce overhead of communications consumed by network administration. Such network administrative functions include providing one device, called a "client," with information regarding the existence of other devices, such as printers. It is important that information concerning the existence of devices on the network be provided in a manner which avoids data conflicts and in a manner which consumes as little network communications overhead as possible.

It is possible to provide network data on a file retained by each client, but this requires that each client maintain updated information regarding the status of the network. In the case of multiple subnetworks, communication between the subnetworks may not be continuous, and therefore providing continuous update information may not be desirable.

In a general request for information through a network, if multiple responses are expected, the multiple responses must be timed, or another manner of resolving response conflict must be provided. Such a request may be used for network device detection.

There are several methods for network device detection:

1. A process can search its host's internal tables to learn what network nodes have been in contact recently. Next it can search each of the discovered network node's tables to learn who they have been in contact with. This process is then continued indefinitely to discover network nodes. This process can be slow and under some circumstances can miss a network node, given a finite amount of time. Totally passive network nodes may be missed entirely.

2. Network nodes can announce themselves to all servers on a network. Any host can then ask its server to enumerate all nodes it knows about. This technique is disadvantageous in that the network nodes use substantial amounts of network bandwidth by constantly broadcasting their presence. Network nodes which do not broadcast their presence are not discoverable.

3. A process can broadcast its own desire to know all network nodes, possibly of a specific type. It can then gather the replies from all network nodes which respond to the broadcast. This has the disadvantage that a great deal of network traffic can be consumed if the requested node type cannot be specified. Network collisions may cause network nodes to be missed. Devices on a remote subnetwork may be missed if broadcast packets cannot reach that network.

It is therefore desired to provide a network communications protocol which permits rapid and complete information regarding the existence and addresses of selected peripheral devices on a network. It is desired that such communications consume as little bandwidth and time as possible, and not place an excessive computing burden on the devices on the network. It is desired that the protocol reduce the possibility of data conflict.

The techniques of the present invention are implemented when a computer device desires to know of a selected type of device on the network. The "desire" usually is in the nature of a program call for a listing of the device, although it is possible that a user may make the request for the listing of the selected type of device directly.

The invention was developed for use in a network which includes printers which have unique addresses on the network and which are controlled by hosts on the network. It is desired that a computer device on the network be able to address the printer, and in order to do so must know the network address of the printer. It is of course contemplated that the invention may be used with other devices on a network, including other peripheral devices, printer queues, and other resources.

In its preferred embodiment, the invention is used to discover devices on a TCP/IP network, which is commonly used in UNIX applications. UNIX is a registered trademark of AT&T Bell Laboratories. The LANs may include one or more subnetworks (subnets). The preferred embodiment of the invention uses Ethernet or Token Ring local area networks (LANs). The LANs may or have communication links with other LANs, forming a full network consisting of multiple subnets. It is contemplated that the invention may be used with other types of networks, and with operating systems other than UNIX.

SUMMARY OF THE INVENTION

In accordance with the invention, a network communications protocol is used on a network in which a client device, such as a computer, is able to transmit messages to other devices on a local network. Other devices on the network include one or more hosts. The network may also include peripheral devices such as printers. In particular, the invention was developed for use in a network which includes printers which have unique addresses on the network and which are configured by hosts on the network.

In accordance with the invention, a client device, such as a computer, requests information by issuing a general message to a local subnetwork (subnet). This general message is referred to as a "HALE" message. The HALE message is a broadcast message on the subnet, and each host on the subnet is able to receive the HALE message. The HALE message preferably is a request for the existence of data listing addresses of a predetermined type of peripheral device. The predetermined type of peripheral device is preferably associated with a server such as a bootserver.

The bootserver is a host which is able to provide information regarding the addresses of one or more of the predetermined type of peripheral device. It is also possible to have a peripheral device which is not served by a bootserver. In order for the peripheral device to be readily recognized by the client, a host on the network should have information concerning the peripheral device. A host which has information concerning the predetermined type of peripheral device is considered to be an affected host. Since the bootserver is able to provide information regarding the address of at least one peripheral device, the bootserver is considered to be an affected host.

For the purposes of this invention, an affected host considered to be a server, although in general a computer device may be a server for a peripheral device of a type which we are not interest in finding. While separate servers and peripheral devices are described, it is of course conceivable within the scope of this invention that the server may be combined with the peripheral device.

On receipt of the HALE message, each host with data indicating the connection of the predetermined type of peripheral device responds with an ACK message. The ACK message contains the address of the server (the address of the host). The client uses the address data in the ACK messages to generate a list of hosts which are servers. The servers are later queried by the host in order to generate a list of the predetermined type of peripheral device available on the subnet.

Hosts with valid addresses of the predetermined type of peripheral device are therefore considered to be servers. Preferably, only servers respond to the HALE message. The client in response to receiving the message with the host address, provides a "stifle" message to the host. The stifle message indicates that the client has received the host's identifying data from the host, and causes the host not to repeat the host's response on subsequent HALE inquiries. The client then repeats its HALE message in order to receive unacknowledged responses from other hosts. In that manner, neither the client nor the network need have provisions to have 100% reliability in receiving simultaneous responses from multiple hosts. Those hosts from which the ACKs are not received are not acknowledged with the stifle message, and continue to respond to subsequent HALE messages. When the client successfully receives the ACKs from all of the affected hosts, all of the affected hosts would in turn have been sent stifle messages. This results in the client no longer receiving responses to the HALE message. Since the client has successfully received the ACKs from all of the affected hosts, the client has the addresses of the affected hosts when they have been sent stifle messages.

The HALE message is also received by servers which list addresses of "agents" on connected subnetworks (subnets). These servers are known as agent servers and are also affected hosts because they have pertinent address data.

The agents are computer devices which are able to provide information regarding bootservers on a separate subnet which is not reachable by the HALE message. For this invention, an agent is used to provide such information to the client, when the client is on a different subnet from the agent. Preferably, the agent provides information concerning bootservers for the predetermined type of peripheral devices on the same subnet as the agent. The agents are therefore computer devices which are able to provide information regarding peripheral devices or bootservers on a local subnet.

As is the case with servers on the subnet which list peripheral devices, the client in response to receiving the message from a host with a list of agents, provides a stifle message to the affected host having a list of agents. The host, in response to the stifle message will not to repeat the response on subsequent inquiries. In the preferred embodiment, one HALE message is used to obtain a response from both servers for the predetermined type of peripheral devices and servers for agents, and the ACK responses are used to generate a combined list of affected hosts.

After the client has ceased to receive replies from the affected hosts, the client sends a stifle unenable message to each affected host and the stifle is cancelled at this time for the affected hosts. This cancellation of the stifle results in the hosts being enabled to respond to subsequent HALE messages. In addition, the stifle times out within each host, so that absent a message to cancel the stifle, the host will self-cancel the stifle.

It should be noted that the stifle enable functions to unenable response and conversely a stifle unenable enables the response. Thus, when stifle is enabled, the host does not respond.

The hosts on the server list are then queried directly in order to obtain addresses of the predetermined type of peripheral devices. The client sends a message to the affected hosts to provide lists of addresses of the predetermined type of peripheral device, and compiles a list of these addresses.

The client then sends a second query to the affected hosts which requests lists of addresses of agents. The client then uses the addresses of agents to query the agents to provide the addresses of bootservers for the predetermined type of peripheral device. It is possible for the agent to provide addresses of hosts on the agent's subnet, or to provide all addresses of bootservers for a selected group of peripheral devices of the predetermined type. In the preferred embodiment, the agent provides all addresses of bootservers for the selected group of peripheral devices of the predetermined type.

The agent will only respond to inquiries within predetermined connection parameters. This accomplishes two things:

1. It prevents the agent from retransmitting identical inquiries which would result in an agent on the client's subnet transmitting a HALE message to the client's subnet, and thereby prevents an infinite loop condition from existing on the protocol.
2. It limits the number of responses to subnets within the predetermined connection parameters. Thus, a user on one subnet would not be likely to accidently print to a printer to which the user should not have unintentional access. On large networks, such a limitation also reduces communication overhead on the network.

In the preferred embodiment, the response from the agent is limited to a single client-agent connection, rather than permitting an agent to request addresses of other agents. In this manner, normally only a single crossing of boundaries of subnets occurs. This in itself prevents agents on the client's subnet from generating an additional HALE message. It is possible that agents may use a HALE message to obtain lists of servers. In such a case, the HALE message would not obtain other agents, but only servers with address data for the predetermined type of peripheral device.

The preferred embodiment of the invention utilizes the fact that most network printers and X-terminals utilize one of the following methods to configure an IP Address:

1. BOOTPD (Boot Protocol Daemon)—Whenever most network peripheral devices power on they broadcast their Link Level Address (LLA) on the network. They do so with the hope that a process on a host on their subnet will be configured to listen for their LLA and respond back to it with the peripheral's IP Address. BOOTPD is one such process. It utilizes the bootptab file to configure its knowledge of LLA/IP Address pairs.
2. RARPD (Reverse Address Resolution Protocol Daemon)—This is another implementation of the process above. RARPD utilizes a file known as the ethers file to configure its knowledge of LLA/IP Address pairs.

Each system with BOOTPD or RARPD file entries will be configured to run a daemon process (HPNPD) which parses the bootptab and ethers files to learn about potential printers on the network. In this way, HPNPD will have confirmed knowledge of all printers installed from its host.

Whenever a client desires to detect all printers on the network it broadcasts a HALE message to acquire a list of all HPNPDs which know about at least one printer or agent (see below). Then, one by one, the client contacts each HPNPD to query for a list of all printers and agents of which it has knowledge.

To allow for the case where a printer's IP Address is assigned via the front panel or some method other than above, an auxiliary file (hpnpdtab) is also parsed. In this file a list of printers not known through bootptab or ethers, and a list of agents can be placed.

To allow HPNPDs not on the same subnetwork (as a client) to be found, the notion of a network agent was added. Agents are configured in the hpnpdtab file. When a client finds an agent, it contacts the agent and asks it to perform the bootserver search algorithm on the agent's own subnetwork.

This provides the following advantages:

1. If no automated discovery processes are active, there is very little network activity.
2. The time required to discover a network printer is relatively fast and well bounded.
3. No changes to network printers are required to support this scheme.

The invention permits the bootserver of a peripheral device to provide address information of that peripheral device. In the case of multiple addresses for a peripheral device, an address provided by the bootserver is thereby presumed valid, and each different address would be considered to be a separate printer. There is a possibility that a peripheral device may be passive, at least in the sense that it would not provide a response to the HALE message. The provision of the address by the server avoids the possibility of not finding out about such a peripheral device. This also means that the peripheral need not be configured to provide a response, or even recognize the HALE message. This allows the bootserver to provide the IP address of a printer or other peripheral on a network which uses a TCP/IP protocol or similar protocol.

The ability of the client to communicate with agents in order to obtain the address information permits the client to cross network boundaries.

The invention uses a system function call whose output is parsed to find the names and status of configured print queues on a printserver. It is possible to use a system call to generate responses which may be examined to determine if they fit a generic description of the preselected type of peripheral. In the preferred embodiment, the responses are examined to determine if they fit a generic description of the preselected type of peripheral and do not forward to another remote queue. Preferably, the line of the response which specifies the network node is examined to determine the network peripheral associated with the queue.

DESCRIPTION OF THE DRAWINGS

FIG. 2 shows a sequence for obtaining a list of affected hosts. FIG. 3 shows a sequence for querying the hosts for addresses listed by the hosts. FIG. 4 shows a sequence for obtaining bootserver addresses from agents.

DETAILED DESCRIPTION OF THE INVENTION

Figure 1:
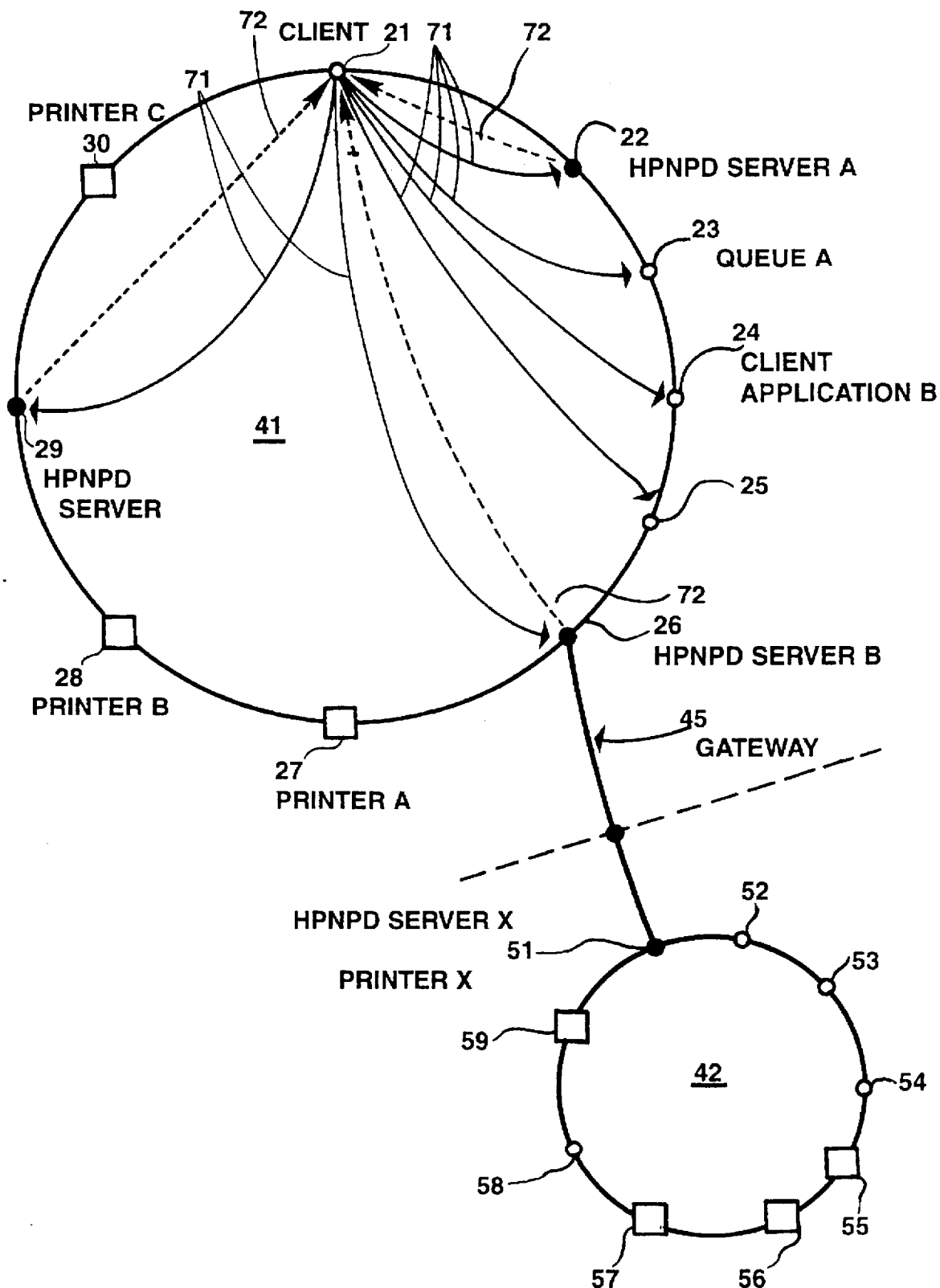
FIG. 1 shows a typical network configuration in which the invention may be implemented.

Referring to FIG. 1, a typical computer network consists of a plurality of computer devices 21-30 on a first subnet 41.

Devices on subnet 41 are directly connected, as by an Ethernet or Token Ring connection, and form a type of local area network (LAN). A second subnet 42 is linked by a gateway 45 to the first subnet 41, and consists of a second plurality of computer devices 51-59. A subnet is a part of the network in which communications between devices can occur without passing through a gateway.

In the preferred embodiment, the network is based on UNIX operating protocols, using TCP/IP network protocols. The Ethernet TCP/IP network protocols use 48 bit Ethernet addresses within the subnets, and 32 bit Internet addresses external of the subnet; for example across gateway 45.

In this representation, devices 21-30 and 51-59 are shown as circles or squares. Devices which are computers (e.g., devices 21-26) or similar devices capable of providing substantial response to inquiries are shown as circles. These are sometimes called physical machines, to distinguish them from peripheral devices. Devices which do not respond to general inquiries, such as printers and other peripheral devices, are shown as squares (e.g., device 27).

It is possible that one or more of the hosts 21-25, 29, 51-54 and 58 is a client device. In the present example, device 21 is considered to be the client device. The invention provides the ability of the client device 21 to request information on the network regarding the addresses of predetermined types of peripheral devices. In the example shown, the peripheral devices are printers which can be discovered through a particular address protocol, implemented by HPNPD.

The request within the local subnet 41 is called a UDP_HALE message, which is initiated by an AutoDetect function. The UDP_HALE message is symbolically represented by solid lines 71. The UDP designation means that the message follows the Unreliable Datagram Packet protocol. UDP messages are transmitted without assurance that message collisions do not occur. This UDP_HALE message 71 is transmitted only on the local subnet 41 of the client 21. The UDP_HALE message is received by all devices 21-30 on the subnet, but only makes sense to those devices which are running HPNPD. As shown in FIG. 1, devices 22, 26 and 29 are HPNPD servers and respond to the UDP_HALE transmission by sending an ACK message. The ACK message is symbolically represented by dotted lines 72.

The ACK message 72 is preferably also sent by UDP protocol. This is advantageous because it allows multiple hosts 22, 26, 29 to send the ACK message 72 without providing a direct method of avoiding collision. Missed ACK messages 72 are simply obtained as responses to subsequent UDP_HALE messages 71. The ACK message 72 is used to allow the AutoDetect function to compile a list of all active servers 22, 26, 29 on the subnet 41. If no active HPNPD servers are on the network, the call to AutoDetect by the client's 21 would be useless, since no ACK message will be obtained. This generates a return=0, meaning that no bootservers were found and no printers were discovered.

With the information compiled by AutoDetect, the client 21 sends a request message to each server to provide addresses for printers for which the server has address information. This follows the Thoroughly Reliable Transport Control Protocol (TCP). This request is specific to each of the active servers 22, 26, 29. The servers 22, 26, 29 respond by searching a file called bootptab and by searching a file called hpnpdtab for valid printer addresses. The servers 22, 26, 29 then reply by transmitting a message back to the client 21 containing the addresses. If a particular server does not have printer addresses present, then the return message from the server indicates no addresses.

The UDP_HALE message 71 does not propagate across the gateway 45 to external subnets, such as subnet 42. In this sense, the subnets 41, 42 are defined as all hosts which can be reached by broadcasting a UDP_HALE message on that subnet. Communications between subnets are achieved between the client's subnet and an agent on a remote subnet. Such communications between subnets are established through the gateway 45 by a host on the client's subnet, which communicates with the agent on the remote subnet. Since the client may also be the communicating host, it is in such cases possible that communications may be established directly between the client and the agent on the remote subnet in the same manner.

The UDP_HALE message 71 includes a request for servers with lists of agents. Any host, such as host 26, having an agent listing responds as a server replies to the UDP_HALE message 71 with an ACK message 72. All servers are later queried by TCP for the addresses of the agents, and the response to this query is the listing of agents. Upon receiving the listing of agents, the client sends a message to each of the agents requesting boot server addresses.

OPERATION

The client 21 first compiles a list of local servers. When a client 21 desires to compile a list of local servers, it will setup a UDP socket and broadcast an HPNPD_STIFLE message with the value set to 0 in order to turn off the stifle. Next the client 21 will broadcast an HPNPD_HALE message 71 on its subnet 41. The client 21 will then enter a select loop for receiving replies. It will receive zero or more replies from hosts 22, 26, 29 which are servers for the predetermined types of peripheral devices on the local subnet 41. For each server 22, 26, 29 which replies, the client 21 will add its name and ipaddress to a list.

Next the client will send an HPNPD_STIFLE message to the server whose ipaddress is added to the list. The HPNPD_STIFLE message is directed to that server and is specific to the address of that server. This HPNPD STIFLE value is set 1 and the server will add the client 21 to a list of clients to which that server will not send an HPNPD_REPLY message. The client 21 will continue to compile ipaddresses until a timeout occurs on the receipt of the replies from the servers 22, 26, 29. The client 21 will then repeat the broadcast HPNPD HALE message 71 and process all replies from servers 22, 26, 29. The client 21 will stop broadcasting HPNPD_HALE message 71s after the client 21 receives no replies from any servers 22, 26, 29. (The client 21 actually makes a few additional attempts after receiving no replies before it will stop broadcasting the HALE messages 71.) The client 21 receiving no replies from any servers 22, 26, 29 indicates that all servers have been stifled and are therefore in the server list.

This establishes a loop in which the client waits for receipt of at least one transmitted response (ACK message 72) to the UDP_HALE message 71. It is possible that no printer addresses appear in any tables on the network, as would of course be the case if there are no printers on the subnet 41. As a result, no ACK messages 72 are received by the client. In this case, the program functions but generates a list containing zero entries.

Once the client 21 has exited the HPNPD_HALE loop, the client 21 sends an HPNPD_STIFLE message to each server 22, 26, 29 in the compiled list to set the stifle value for each of these servers to 0 (stifle unenable). The effect of this HPNPD_STIFLE message is to unstifle the servers 22, 26, 29. In addition, the stifle times out, so if a server misses receiving the HPNPD_STIFLE message, the stifle value will go to 0 after the timeout.

The client 21 then makes a request to transmit a list of printers in bootptab or hpnpdtab directories in the servers 22, 26, 29. In order to accomplish this, after the client 21 has compiled a list of servers, the client 21 will set up a loop in which the client 21 will process each server 22, 26, 29 in the list. For each server 22, 26, 29 in the list, it will establish a TCP connection, send over an HPNPD_REQUEST packet, and wait for the replies. This is repeated for each server 22, 26, 29 in the list.

When the client 21 receives an HPNPD_REPLY message, the client 21 will look at a quantity (qty) field and set up a loop from 1-n, where n=qty. For each cycle through this loop, the client 21 will receive an HPNPD_ITEM message and process each message by adding this information to an HPNPD list.

It is possible for the client 21 to request multiple lists of different types. This is particularly common with printers, which may be of different types. It is also possible to compile lists of multiple types of peripherals. If the client 21 receives multiple lists of different types, the client 21 will compile the number of types of lists it is requesting. For each type, it will receive a list of one type by separately sending requests for each type to each server 22, 26, 29 on the list of servers.

When the UDP HALE broadcast is transmitted, the client 21 also requests hosts with lists of agents on other subnets (e.g., subnet 42). The request for agents queries the client's subnet 41 for hosts which "know" of remote agents, such as host 26. The host 26 would "know" of remote agents by the agent being documented in an hpnpdtab file in the host 26. Hosts with lists of agents are considered agent servers.

In the preferred embodiment, the UDP_HALE request for hosts 26 with agents is combined with the request for hosts 22, 26, 29 which are servers for the predetermined types of peripheral devices on the local subnet 41. Both requests are broadcast on the local subnet 41 as part of the same UDP_HALE request. The hosts 22, 26, 29 respond with ACK messages 72 and the client 21 forms a combined, consolidated list of servers 22, 26, 29. As is the case with the request for servers with lists of the predetermined type of peripheral device, HPNPD_STIFLE and repeated UDP_HALE messages 71 are used to obtain complete lists of hosts.

When the client 21 has obtained the list of printer addresses, the client makes a request to transmit a list of agents in bootptab or hpnpdtab directories in the servers 22, 26, 29. In order to accomplish this, after the client 21 has compiled a list of servers, the client 21 will again set up a loop in which the client 21 will process each server 22, 26, 29 in the list. For each server 22, 26, 29 in the list, it will establish a TCP connection, send over an HPNPD_REQUEST packet, and wait for the replies. This is repeated for each server 22, 26, 29 in the list.

In receiving the replies from each host 22, 26, 29 for addresses of either printers or agents, it is not necessary that each host 22, 26, 29 have such addresses in its directories. This is important, since lists of hosts with two types of addresses have been consolidated by the client 21, making the lack of addresses of either printers or agents a likely circumstance.

When the client 21 receives an HPNPD_REPLY message, the client 21 will look at a quantity (qty) field and set up a loop from 1-n, where n=qty. For each cycle through this loop, the client 21 will receive an HPNPD_ITEM message and process each message by adding this information to an HPNPD list. When querying hosts for lists of agents, the client 21 transmits a message requesting the lists of agents. The host replies by providing the addresses of known agents.

The client 21 uses the information, which contains agents' addresses to query the agents of the existence of the predetermined type of peripheral device on their subnet (eg., subnet 42). This establishes a loop in which the client connects to each agent 51 in turn, and requests the agent 51 to report back with a list of all bootservers on its local subnet 42. It is possible that no boot addresses appear in any tables on the subnet. As a result, no addresses of bootservers are received by the client. In this case, the program functions but generates a list containing zero entries for possibly accessible remote bootservers.

Figure 2:
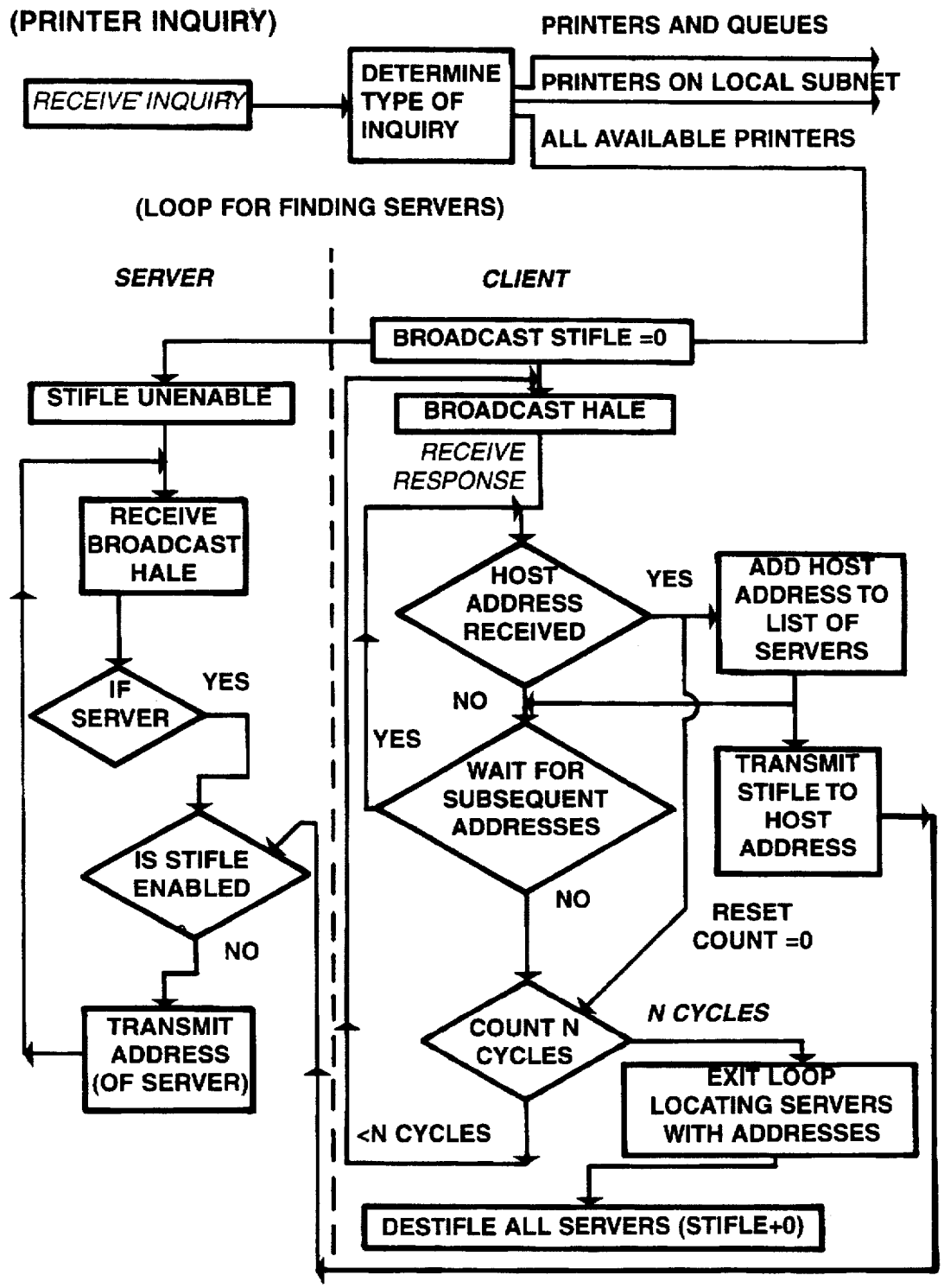
FIGS. 2-4 shows a logical sequence of messages used to retrieve address data for peripheral devices.
Figure 3:
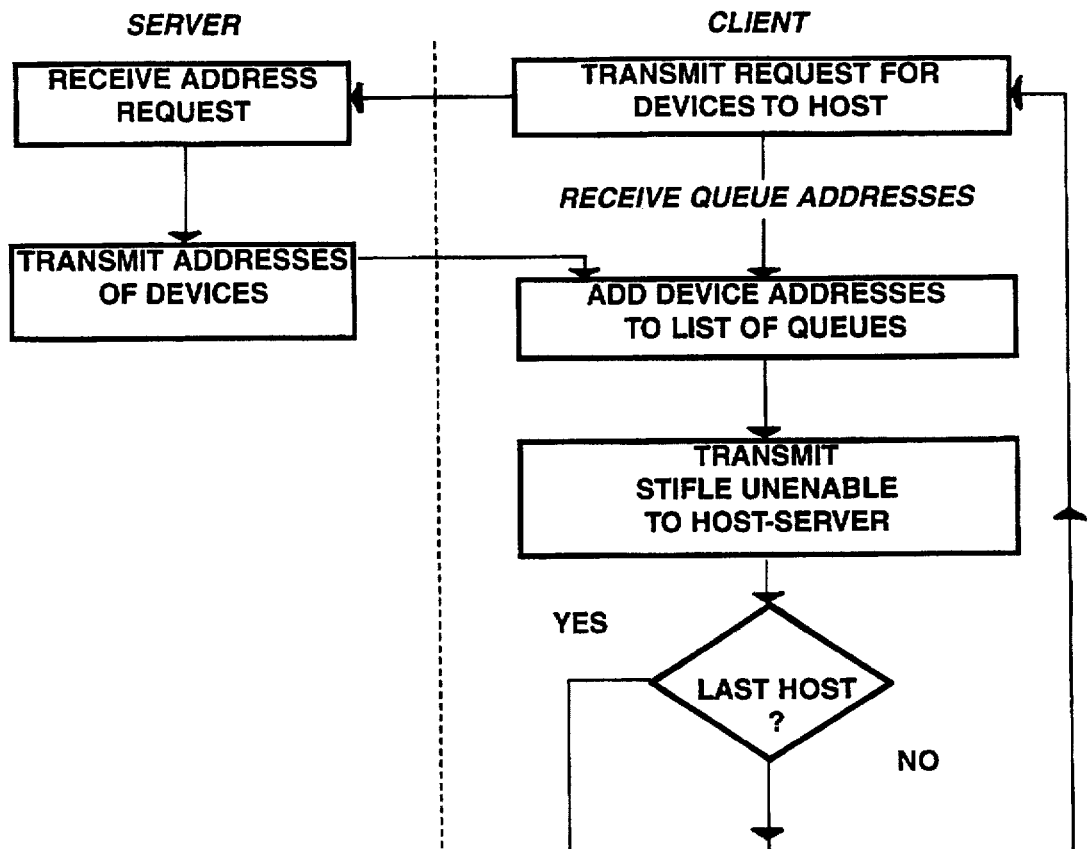
Figure 4:
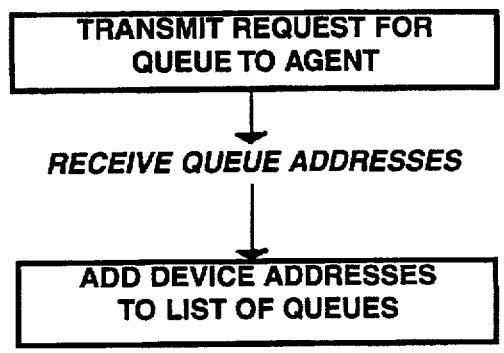

FIGS. 2–4 show a logic flow diagram of the invention. FIG. 2 shows a loop for obtaining a servers, which in the case shown includes servers with printer queue addresses and agent servers. FIG. 3 shows the loop for obtaining addresses from the servers. This loop is sequenced a first time in order to obtain servers with addresses of printers and is again sequenced to obtain addresses of agents. Once the addresses of agents are obtained, the sequence of FIG. 4 is performed to obtain the addresses of bootservers from the agents, by using the addresses of agents previously obtained.

Referring to FIG. 2, after a stifle unenable is transmitted to the hosts, a broadcast HALE message is transmitted, which is the aforementioned UDP_HALE message. When an ACK is received from a host which is a server, the client adds the host address to a list of servers, and sends a STIFLE_ENABLE message to the host at that address. This is followed by repeating the broadcast HALE message until a predetermined number of cycles after no ACKs are received. The HALE, ACK and STIFLE messages are UDP transmissions. Repetition of the messages occurs until a STIFLE_ENABLE message is received by the host. No responses need be obtained from hosts which are not servers.

In this manner, repeated HALE messages are transmitted by the client and responded to by the host-server. This repetition ceases when the client acknowledges the server by transmitting a stifle enable message to the host address. In the preferred embodiment, the HALE message, the ACK messages and the STIFLE messages are transmitted by the UDP protocol.

In the sequence of FIG. 3, TCP/IP transmissions are provided to each server requesting a type of address to be requested from the hosts. This cycle is repeated each type of address to be requested. In the preferred embodiment, these addresses are those of printers and those of agents. Since the hosts only provide addresses as requested, a host which has no addresses of a particular type does not provide addresses in response to the TCP/IP inquiry. The stifle is unnecessary during this sequence, and has been unenabled during the HALE sequence.

FIG. 4 shows the generation of a list of bootserver addresses. These are bootserver addresses obtained from agents on foreign networks. The addresses of agents obtained in the sequence of FIG. 3 are used to address the agents to obtain this list.

In the preferred embodiment, when looking for hosts which are servers and hosts which have agent addresses, these loops are consolidated, and a single HALE message would call for each type of address whenever broadcast. The receipt of addresses can be used to form a single list of servers, or two separate lists. In the preferred embodiment, a single list of servers is generated, indicating that the host has a listing of addresses for the predetermined type of peripheral and those with addresses for agents.

FIG. 3 shows the sequence for obtaining addresses from hosts on the client's subnet. In this sequence, addresses of printers and of agents are obtained in the same manner; hence the generic representation of addresses for "devices."

In the case of the devices being agents, it remains necessary to further obtain the addresses of the predetermined type of peripheral device. FIG. 4 shows this sequence. It is noted that the sequences (FIGS. 3 and 4) of obtaining the addresses of the predetermined types of peripheral devices are accomplished with direct TCP/IP communications. Therefore, it is not necessary to provide for repetitive broadcast call loops.

The combination of broadcast calls and direct communications permits a general transmission to be used to obtain all possible responses, while depending on directly addressed (to the host servers) communications to provide the data in the response. While the invention was described in connection with a UNIX network using Ethernet and Internet protocols, it is understood that the inventive features could be applied to other types of operating systems and networks. It is further contemplated that the invention could and will be modified as needed to permit message transmission with different limitation, such as messages which may be transmitted beyond a single agent connection. It is also possible to combine the data obtained as described with data which is obtained by other techniques, such as data relating to previous connections by clients or hosts. Accordingly, the invention should be read as limited only by the claims.

What is claimed is:

1. A method of operating a computer on a computer network having a plurality of different types of devices connected for data communication, said network further having a plurality of hosts, each said host has at least one device address, in order to provide said computer with a list of addresses of said plurality of different types of devices on the computer network, comprising the steps of:

a. causing a first message on the network;
   b. waiting for receipt of at least one transmitted response to the first message, said transmitted responses provided by ones of plurality of hosts on the computer network, and said transmitted responses to the transmitted messages including address information;
   c. if said transmitted response is received, discontinuing transmission of said transmitted response;
   d. waiting for receipt of a subsequent transmitted response;
   e. said computer transmitting a discontinue command which includes sufficient address information to allow said host from which said computer received a transmitted response to respond by discontinuing said transmission, while not discontinuing transmission from different hosts having different addresses;
   f. discontinuing transmission of said subsequent transmitted response;
   g. repeating steps d trough f until receipt of a predetermined complete set of responses by said computer;
   h. said transmitted responses transmitted by said plurality of hosts;
   i. using said transmitted responses from the hosts to the transmitted messages to obtain address information of the hosts providing the transmitted responses;
   j. said computer transmitting a discontinue command which includes sufficient address information to allow a host from which said computer received a transmitted response to respond by discontinuing said transmission, while not discontinuing transmissions from different hosts prior to said different hosts receiving a discontinue command, thereby discontinuing transmission of said subsequent transmitted response by said host from which said computer received a transmitted response; and k. using the address information of the hosts providing the transmitted responses to query said hosts for address data of a predetermined type of devices.

2. The method of claim 1, further comprising:

a) said network including a home subnetwork on which said computer resides and further including at least one connection to a foreign subnetwork;

b) limiting transmission of the first message to prevent transmission of the first message across at least said connection to the foreign subnetwork; and c) obtaining foreign address information from one of said devices, said foreign address information identifying agents on the foreign subnetwork.

3. The method of claim 2, further comprising:

a) said network including a home subnetwork on which said computer resides and further including at least one connection to a foreign subnetwork;

b) limiting transmission of the first message to prevent transmission of the first message across at least said connection to the foreign subnetwork;

c) obtaining foreign address information from one of said hosts, said foreign address information identifying agents on the foreign subnetwork; and d) querying at least one agent on the foreign subnetwork for address information of an agent on said foreign subnetwork.

4. The method of claim 3, further comprising:

a) using 48-bit addresses for transmitting messages solely within the local subnetwork; and b) permitting the use of 32-bit addresses for transmitting messages between the local subnetwork and said foreign subnetwork.

5. The method of claim 3, further comprising:

a) using addresses size of a first length for transmitting messages solely within the local subnetwork; and b) permitting the use of an address size of a second, shorter length for transmitting messages between the local subnetwork and said foreign subnetwork.

6. A method of operating a computer on a computer network having a plurality of different types of devices connected for data communication, said network including a plurality of hosts connected to a home subnetwork on which said computer resides and further including at least one connection to a foreign subnetwork, in order to provide said computer with a list of addresses of said plurality of different types of devices on the network, each said host has at least one device address or one agent address wherein said agent has a plurality of device addresses connected to said foreign subnetwork, comprising the steps of:

a. transmitting a first message on the network;

b. waiting for receipt of at least one transmitted response to the first message;

c. using information from said transmitted response to the first message to obtain address information for addressing one of said agents for the foreign subnetwork;

d. addressing the agent in order to obtain the addresses of said devices on the foreign subnetwork from the agent;

e. repeating steps c and d for different ones of said agents in order to obtain said list of addresses;

f. said transmitted response transmitted by ones of said plurality of hosts on the home subnetwork;

g. using said transmitted responses from the hosts to the transmitted messages to obtain address information of the hosts providing the transmitted responses;

h. said computer transmitting a discontinue command which includes sufficient address information to allow a host from which said computer received a transmitted response to respond by discontinuing said transmission, while not discontinuing transmissions from different hosts prior to said different hosts receiving a discontinue command, thereby discontinuing transmission of said subsequent transmitted response by said host from which said computer received a transmitted response; and i. using the address information of the hosts providing the transmitted responses to query said hosts for address data of a predetermined type of devices.

7. The method of claim 6 further comprising:

a) upon receipt of said transmitted response to the first message, discontinuing transmission of said transmitted response;

b) waiting for receipt of a subsequent transmitted response;

c) discontinuing transmission of said subsequent transmitted response; and d) repeating steps b and c until receipt of a predetermined complete set of responses by said computer.

8. The method of claim 6, further comprising:

a) limiting transmission of the first message to prevent transmission of the first message across at least said connection to the foreign subnetwork; and b) obtaining foreign address information from one of said devices, said foreign address information identifying agents on the foreign subnetwork.

9. The method of claim 8, further comprising:

a) limiting transmission of the first message to prevent transmission of the first message across at least said connection to the foreign subnetwork;

b) obtaining foreign address information from one of said hosts, said foreign address information identifying agents on the foreign subnetwork; and c) querying at least one agent on the foreign subnetwork for address information of an agent on said foreign subnetwork.

10. The method of claim 9, further comprising:

a) using 48-bit addresses for transmitting messages solely within the local subnetwork; and b) permitting the use of 32-bit addresses for transmitting messages between the local subnetwork and said foreign subnetwork.

11. The method of claim 9, further comprising:

a) using addresses size of a first length for transmitting messages solely within the local subnetwork; and b) permitting the use of an address size of a second, shorter length for transmitting messages between the local subnetwork and said foreign subnetwork.

* * * * *